United States Patent
Schorzman et al.

(10) Patent No.: US 7,402,634 B2
(45) Date of Patent: Jul. 22, 2008

(54) PERFLUOROCYCLOBUTANE COPOLYMERS

(75) Inventors: Derek Schorzman, Pittsford, NY (US); Joseph C. Salamone, Fairport, NY (US)

(73) Assignee: Bausch and Lamb Incorporated, Rochester, NY (US)

( * ) Notice: Subject to any disclaimer, the term of this patent is extended or adjusted under 35 U.S.C. 154(b) by 343 days.

(21) Appl. No.: 11/173,707

(22) Filed: Jul. 1, 2005

(65) Prior Publication Data
US 2007/0004867 A1 Jan. 4, 2007

(51) Int. Cl.
*C08F 14/18* (2006.01)

(52) U.S. Cl. ............... 525/362.2; 525/50; 525/292; 526/211; 526/242

(58) Field of Classification Search ............ 525/326.2, 525/292, 50; 526/242, 211
See application file for complete search history.

(56) References Cited

U.S. PATENT DOCUMENTS

| | | | |
|---|---|---|---|
| 3,114,778 A | 12/1963 | Fritz et al. |
| 3,310,606 A | 3/1967 | Fritz et al. |
| 3,326,984 A | 6/1967 | Anderson et al. |
| 3,397,191 A | 8/1968 | Beckerbauer |
| 3,408,429 A | 10/1968 | Wichterle |
| 3,660,545 A | 5/1972 | Wichterle |
| 4,113,224 A | 9/1978 | Clark et al. |
| 4,197,266 A | 4/1980 | Clark et al. |
| 4,440,918 A | 4/1984 | Rice et al. |
| 4,555,732 A | 11/1985 | Tuhro |
| 4,954,587 A | 9/1990 | Mueller |
| 4,990,582 A | 2/1991 | Salamone |
| 4,996,275 A | 2/1991 | Ellis et al. |
| 5,010,141 A | 4/1991 | Mueller |
| 5,021,602 A | 6/1991 | Clement et al. |
| 5,023,380 A | 6/1991 | Babb et al. |
| 5,037,917 A | 8/1991 | Babb et al. |
| 5,037,918 A | 8/1991 | Babb |
| 5,037,919 A | 8/1991 | Clement et al. |
| 5,066,746 A | 11/1991 | Clement et al. |
| 5,079,319 A | 1/1992 | Mueller |
| 5,091,500 A | 2/1992 | Lysenko et al. |
| 5,159,036 A | 10/1992 | Babb |
| 5,159,037 A | 10/1992 | Clement et al. |
| 5,159,038 A | 10/1992 | Babb et al. |
| 5,196,569 A | 3/1993 | Hung |
| 5,198,513 A | 3/1993 | Clement et al. |
| 5,210,265 A | 5/1993 | Clement et al. |

(Continued)

FOREIGN PATENT DOCUMENTS

EP 0084406 A1 7/1983

(Continued)

OTHER PUBLICATIONS

Rizzo et al., Polymer, vol. 41, pp. 5125-5136, (2000).*

(Continued)

*Primary Examiner*—Peter D. Mulcahy
*Assistant Examiner*—Henry Hu
(74) *Attorney, Agent, or Firm*—John E. Thomas

(57) ABSTRACT

The present invention provides copolymer having repeating units based on polyoxyalkylene radicals, polysiloxane radicals and perfluorocyclobutane radicals. The copolymers are useful as biomedical devices such as contact lenses or intraocular lenses.

14 Claims, 1 Drawing Sheet

U.S. PATENT DOCUMENTS

| | | | |
|---|---|---|---|
| 5,225,515 | A | 7/1993 | Lysenko et al. |
| 5,246,782 | A | 9/1993 | Kennedy et al. |
| 5,268,511 | A | 12/1993 | Farnham |
| 5,271,875 | A | 12/1993 | Appleton et al. |
| 5,313,003 | A | 5/1994 | Krüger et al. |
| 5,364,547 | A | 11/1994 | Babb et al. |
| 5,364,917 | A | 11/1994 | Babb et al. |
| 5,391,796 | A | 2/1995 | Farnham |
| 5,409,777 | A | 4/1995 | Kennedy et al. |
| 5,426,164 | A | 6/1995 | Babb et al. |
| 5,965,631 | A * | 10/1999 | Nicolson et al. ............ 523/106 |
| 6,559,237 | B1 | 5/2003 | Mao et al. |
| 6,646,075 | B2 | 11/2003 | Mao et al. |
| 6,649,715 | B1 | 11/2003 | Smith et al. |
| 7,091,283 | B2 * | 8/2006 | Muller et al. ............... 525/292 |
| 2002/0007083 | A1 | 1/2002 | DesMarteau et al. |
| 2002/0065382 | A1 | 5/2002 | Mao et al. |

FOREIGN PATENT DOCUMENTS

| | | | |
|---|---|---|---|
| EP | | 84406 A1 * | 7/1983 |
| WO | WO-2007/005334 A1 * | | 1/2007 |

OTHER PUBLICATIONS

Babb et al., "Perfluorocyclobutane Aromatic Ether Polymers. III. Synthesis and Thermal Stability of a Thermoset Polymer Containing Triphenylphosphine Oxide", *Journal of Applied Polymer Science*, vol. 69, pp. 2005-2012 (1998).

Babb et al., "Perfluorocyclobutane Aromatic Ether Polymers", *Journal of Polymer Science: Part A: Polymer Chemistry*, vol. 31, pp. 3465-3477 (1993).

Babb et al., "Perfluorocyclobutane Aromatic Ether Polymers", *Polymer. Prepr.*, 34(1), pp. 413-414 (1993).

Boone et al., "A New Aromatic Perfluorocyclobutane Polymer: Synthesis and Thermal Characterization of 1,3,5-Tris[(4-trifluorovinyloxy)phenyl]benzene", *Polymer. Prepr.*, 39(2), pp. 812-813 (1998).

Brandwood et al., J. Fluorine Chem. vol. 6, pp. 37-57 (1975).

Choi et al., "Synthesis and polymerization of trifluorovinylether-terminated imide oligomers I", *Polymer* 41, pp. 6213-6221 (2000).

Haken, "Studies in Trans-Esterification IV", *J. Appl. Chem.*, vol. 16 (March), p. 89 (1966).

Jasper et al., "New Monomers and Polymers Based on Trifluorovinyl Ether Functionalized Organosilanes, Siloxanes and Aminosilanes", Book of Abstracts, 215th ACS National Meeting, Dallas, Mar. 29-Apr. 2, 1998, 425.

Ji, et al., "[p-((Trifluorovinyl)oxy)phenyl]lithium: Formation, Synthetic Utility and Theoretical Support for a Versatile New Reagent in Fluoropolymer Chemistry" *Organometallics*, vol. 17, pp. 783-785 (1998).

Jin et al., "Synthesis and Characterization of Phenylphosphine Oxide Containing Perfluorocyclobutyl Aromatic Ether Polymers for Potential Space Applications", *Macromolecules*, vol. 36, pp. 9000-9004 (2003).

Kang, et al., "A Hyperbranched Aromatic Fluoropolyester for Photonic Applications", *Macromolecules*, vol. 36, pp. 4355-4359 (2003).

Kennedy et al., "Perfluorocyclobutane Aromatic Ether Polymers. II. Thermal/Oxidative Stability and Decomposition of a Thermoset Polymer", *Journal of Polymer Science: Part A: Polymer Chemistry*, vol. 33, pp. 1859-1865 (1995).

Kumar et al., "Synthesis and Polymerization of 1,1,1-tris(4-trifluorovinyloxyphenyl)2,2,2-trifluoroethane. A New Low Loss Optical Polymer", *Polymer Preprints*, vol. 42(2), pp. 500-501 (2001).

Ligon et al., "First separation of characterization of *cis* and *trans* 1,2-bisaryloxy perfluorocyclobutanes", *Journal of Fluorine Chemistry*, vol. 123, pp. 139-146 (2003).

Liou et al., "The Effect of Crosslinking on Thermal and Mechanical Properties of Perfluorocyclobutane Aromatic Ether Polymers", *Journal of Polymer Science: Part B: Polymer Chemistry*, vol. 36, pp. 1383-1392 (1998).

Lousenberg et al., "Synthesis of Trifluorovinyl Ethane Incorporating Functionalized Hydrocarbon Ether Groups: Insight into the Mechanism of Trifluorovinyl Ether Formation from Trimethylsilyl 2-alkoxy-2,3,3,3,-tetrafluoropropionates", *J. Org. Chem.*, vol. 62, pp. 7844-7849 (1997).

Ma et al., "Novel Class of High-Performance Perfluorocyclobutane-Containing Polymers for Second-Order Nonlinear Optics", *Chem. Mater.*, vol. 12, pp. 1187-1189 (2000).

Mellon et al., "Kinetics and Radical Characterization of Aryl Trifluorovinyl) Ether Polymerization Using ESR Spectroscopy", *Polymer Preprints*, vol. 44(1), pp. 1181-1182 (2003).

Rizzo et al., "Perfluorocyclobutane-containing silarylene-siloxane polymers with pendant trifluoropropyl groups", *Polymer. Prepr.*, 40(2), pp. 874-875 (1999).

Rizzo et al., "Preparation of Trifluorovinylether-terminated fluorosilicone oligomers" Book of Abstracts, 217th ACS Meeting, Anaheim, CA, Mar. 21-25, 1999.

Rizzo et al., "Synthesis and thermal properties of fluorosilicaones containing perfluorocyclobutane rings", *Polymer 41*, pp. 5125-5136, (2000).

Sarathy et al., "Fluorosilicone Networks From Trifluorovinyl Ether Pendant Polysiloxanes", *Polymer. Prepr.*, 39(1), pp. 530-531 (1998).

Sarathy et al., "Hydrosilation Polymerization and Thermal Cure of Divinyl Trifluorovinyl Ether Monomers", *Polymer Prepr.*, 39(1), pp. 609-610 (1998).

Shah et al., "Perfluorocyclobutane (PFCB) Polymers for Optical Fibers and Dielectric Waveguides", *Polymer. Prepr.*, 40(2), pp. 1293-1294 (1999).

Smith et al., "Crystalline Perfluorocyclobutane Polymers Containing the Hexafluoroisopropylidine Group", *Polymer Preprints*, vol. 41(1), pp. 60-61 (2000).

Smith et al. "Perfluorocyclobutyl Liquid Crystalline Fluoropolymers. Synthesis and Thermal Cyclopolymerization of Bis (trifluorovinyloxy)α-methylstilbene", *Macromolecules*, vol. 33 No. 4, pp. 1126-1128 (2000).

Smith et al., "Perfluorocyclobutane Aromatic Polyethers. Synthesis and Characterization of New Siloxane-Containing Fluoropolymers", *Macromolecules*, vol. 29, pp. 852-860 (1996).

Smith et al., "Fluorosilicones Containing the Perfluorocyclobutane Aromatic Ether Linkage", ACS Symposium Series (2000), 729 (Silicaones and Silicone-Modified Materials), Chapter 20, pp. 308-321.

Souzy et al., "Synthesis and (co)polymerization of monofluoro, difluoro, trifluorostyrene and ((trifluorovinyl)oxy)benzene", *Prog. Polym. Sci.*, vol. 29, pp. 75-106 (2004).

Topping et al., "Toward Crown Ether Containing Semifluoroinated Polyarylene Amides for Lithium Battery Membranes", *Polymer Preprints*, 43(1), pp. 486-487 (2002).

Wong et al., "Highly Fluorinated Trifluorovinyl Aryl Ether Monomers and Perfluorocyclobutane Aromatic Ether Polymers for Optical Waveguide Applications", *Macromolecules*, vol. 36, pp. 8001-8007 (2003).

Yuan et al., "Insights into the Properties of Novel Trifluorovinyl Ether Copolymers", *Macromolecules*, vol. 32, pp. 2669-2674 (1999).

Yuan et al., "Surface Enrichment of Poly(trifluorovinyl ether)s in Polystyrene Blends", *Macromolecules*, vol. 33, pp. 4926-4931 (2000).

* cited by examiner

PERFLUOROCYCLOBUTANE COPOLYMERS

BACKGROUND OF THE INVENTION

1. Technical Field

The present invention generally relates to perfluorocyclobutane copolymers and their use as biomedical devices such as contact lenses or intraocular lenses.

2. Description of Related Art

In the field of biomedical devices such as contact lenses, various physical and chemical properties such as, for example, oxygen permeability, wettability, material strength and stability are but a few of the factors that must be carefully balanced in order to provide a useable contact lens. For example, since the cornea receives its oxygen supply exclusively from contact with the atmosphere, good oxygen permeability is a critical characteristic for any contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

Contact lenses made from fluorinated materials have been investigated for a number of years. Such materials can generally be subdivided into two major classes, namely hydrogels and non-hydrogels. Hydrogels can absorb and retain water in an equilibrium state whereas non-hydrogels do not absorb appreciable amounts of water. Regardless of their water content, both hydrogel and non-hydrogel fluorinated contact lenses tend to have relatively hydrophobic, non-wettable surfaces.

By introducing fluorine-containing groups into contact lens polymers, the oxygen permeability can be significantly increased. For example, U.S. Pat. No. 4,996,275 discloses using a mixture of comonomers including the fluorinated compound bis(1,1,1,3,3,3-hexafluoro-2-propyl)itaconate in combination with organosiloxane components. Fluorinating certain polysiloxane materials has been indicated to reduce the accumulation of deposits on contact lenses made from such materials. See, for example, U.S. Pat. Nos. 4,440,918; 4,954,587; 4,990,582; 5,010,141 and 5,079,319. However, fluorinated polymers can suffer from one or more of the following drawbacks: difficult and/or expensive synthetic routes, poor processability, low refractive index, poor wettability, poor optical clarity, poor miscibility with other monomers/reagents and toxicity.

The thermal polymerization products of trifluorovinyl-containing monomers, e.g., bis-trifluorovinyl monomers, to form perfluorocyclobutylene polymers are known. See, e.g., U.S. Pat. Nos. 5,021,602; 5,023,380; 5,037,917; 5,037,918; 5,037,919; 5,066,746; 5,159,036; 5,159,037; 5,159,038; 5,162,468; 5,198,513; 5,210,265; 5,246,782; 5,364,547; 5,364,917 and 5,409,777. U.S. Pat. No. 5,225,515 discloses poly(aromatic ether) polymers or copolymers containing perfluorocyclobutane rings in the polymer backbone. Smith et al., "Perfluorocyclobutane Aromatic Polyethers. Synthesis and Characterization of New Siloxane-Containing Fluoropolymers", Macromolecules, Volume 29, pp. 852-860 (1996) discloses copolymerization of bis(1,3-[4-(trifluorovinyloxy)phenyl])-1,1,3,3-tetramethyldisiloxane with 1,1,1-tris(4-[trifluorovinyloxy]phenyl)ethane. However, there has been no recognition or appreciation of copolymers containing perfluorocyclobutane rings in the polymer backbone and linkages based on at least two of poly(alkyl ether) groups, polyorganosiloxane groups and poly(perfluorocyclobutane) groups or that such materials can be employed in the manufacture of biomedical devices and particularly contact lens applications.

Accordingly, it would be desirable to provide improved fluorinated materials for use in the manufacturing of biomedical devices for prolonged contact with the body while also being biocompatible.

SUMMARY OF THE INVENTION

In accordance with one embodiment of the present invention, a perfluorocyclobutane ring-containing copolymer is provided which is obtained by the copolymerization of at least two of the following prepolymers (a) T-(P)$_n$-T, (b) T$^1$-(P$^1$)$_n$-T$^1$ and (c) T$^2$-(P$^2$)$_n$-T$^2$ wherein T, T$^1$ and T$^2$ are independently of the general formula

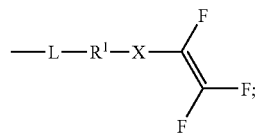

wherein n, L, R$^1$ and X are as defined herein; P is independently an oxyalkylene radical of the general formula

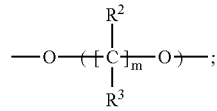

wherein m, R$^2$ and R$^3$ are as defined herein; P$^1$ is a polyorganosiloxane radical of the general formula

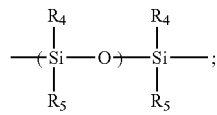

wherein R$^4$ and R$^5$ are as defined herein; and P$^2$ is a perfluorocyclobutane radical of the general formula

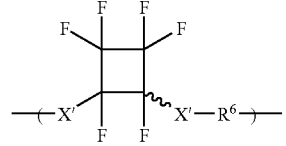

wherein X' and R$^6$ are as defined herein.

In accordance with a second embodiment of the present invention, a copolymer containing perfluorocyclobutane rings in the copolymer backbone is provided and comprises at least two of the following units;

(a) an oxyalkylene unit of the formula

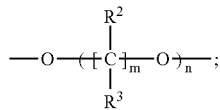

wherein n, L, $R^1$ and X are as defined herein;

(b) a polyorganosiloxane unit of the formula

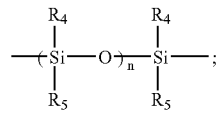

wherein n, $R^4$ and $R^5$ are as defined herein; and (c) a perfluorocyclobutane unit of the formula

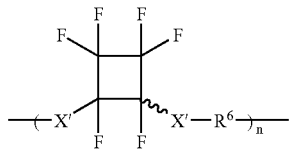

wherein n, X' and $R^6$ are as defined herein.

In accordance with a third embodiment of the present invention, a polymerization product of a mixture comprising (a) T-(P)$_n$-T, (b) $T^1$-($P^1$)$_n$-$T^1$ or (c) $T^2$-($P^2$)$_n$-$T^2$ is provided wherein T, $T^1$, $T^2$, P, $P^1$ and $P^2$ have the aforementioned meanings and wherein at least two of components (a), (b) and (c) are present in the mixture.

In accordance with a fourth embodiment of the present invention, a process for preparing a copolymer is provided comprising polymerizing at least two of the following prepolymers (a) T-(P)$_n$-T, (b) $T^1$-($P^1$)$_n$-$T^1$ and (c) $T^2$-($P^2$)$_n$-$T^2$ for a sufficient time to form the perfluoro containing copolymer, wherein T, $T^1$, $T^2$, P, $P^1$ and $P^2$ have the aforementioned meanings.

Other embodiments of the present invention include biomedical devices comprising one or more of the foregoing copolymers.

Yet other embodiments of the present invention include a contact lens comprising one or more of the foregoing copolymers is provided

DETAILED DESCRIPTION OF THE PREFERRED EMBODIMENTS

Figure 1:
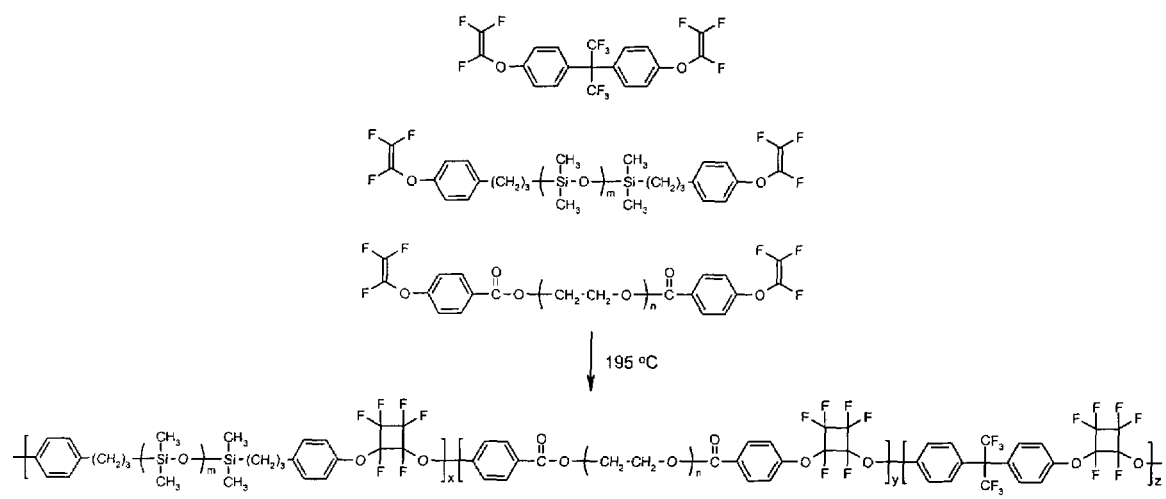
FIG. 1 illustrates the general reaction scheme of Example 2.

The present invention is directed to copolymers derived from at least two of the following prepolymers (a) T-(P)$_n$-T, (b) $T^1$-($P^1$)$_n$-$T^1$ and (c) $T^2$-($P^2$)$_n$-$T^2$, wherein n is independently from 1 to about 100,000 and preferably from about 10 to about 1,000; and T, $T^1$, and $T^2$ are independently of the general formula

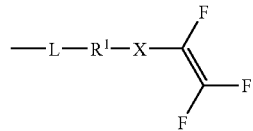

wherein L is an optional linking group and is independently a straight or branched $C_1$-$C_{30}$ alkyl group, a $C_3$-$C_{30}$ cycloalkyl group, a $C_5$-$C_{30}$ aryl group, an ether group, a $C_1$-$C_{20}$ ester group, an amide group, a siloxanyl, an arylsiloxanyl or a fluorosiloxanyl; $R^1$ independently represents one or more inertly substituted groups and X is independently a group which links the inertly substituted group and the trifluorovinyl group. As one skilled in the art would readily appreciate, the trifluorovinyl containing moiety can also be present as one or more pendant groups in the monomer, e.g., in the case where $R^1$ is an alkylene group such as ethylene or in the case where $R^1$ is a polycyclic group, as well as an end group(s). Preferably, the trifluorovinyl containing moiety is present as an end group. The prepolymers herein can independently have a number average molecular weight of from about 100 about 100,000.

The X groups can be the same or different and include, but are not limited to, a bond, an oxygen atom, a sulfur atom, a carboxylic or thiocarboxylic ester group, an amide group, a sulfone, a sulfoxide, a carbonate, a carbamate, a perfluoroalkylene, a perfluoroalkylene ether, an alkylene, an acetylene, a phosphine, a carbonyl or thio carbonyl group, seleno, telluro, nitrido, a silanediyl group, a trisilanediyl group, a tetrasilanetetrayl group, a siloxanediyl group, a disiloxanediyl group, a trisiloxyldiyl group, a trisilazanyl group, a silythio group, a boranediyl group; and the like and combinations thereof. By "inert" it is meant that the structures or substituents do not react undesirably with the perfluorovinyl groups or interfere undesirably with polymerization (e.g., perfluorocyclobutane formation) of the monomers.

Representative $R^1$ groups include, by way of example, a substituted or unsubstituted $C_1$ to $C_{30}$ hydrocarbyl group such as a substituted or unsubstituted $C_1$ to about $C_{30}$ and preferably a substituted or unsubstituted $C_1$ to about $C_{16}$ alkyl or an aromatic group optionally containing one or more heteroatoms; or a $C_3$ to about $C_{25}$ cycloalkyl groups optionally containing one or more heteroatoms, substituted or unsubstituted siloxanyl group, or combinations thereof. In one embodiment, $R^1$ comprises one or more substituted or unsubstituted cyclic or polycyclic containing groups, e.g., one or more substituted or unsubstituted aromatic groups optionally containing one or more heteroatoms, and wherein the X group and either the L or P or $P^1$ or $P^2$ group may independently be bonded to the cyclic group in a position either ortho, meta, and/or para with respect to one another. Suitable aromatic group(s) can be of any molecular structure having aromatic character such as at least one six membered aromatic ring, optionally having any number of such six-membered rings fused together or connected by bonds or linking structures. For example, the aromatic groups can have from 1 to about 50 such substituted or unsubstituted aromatic rings, and preferably from 1 to about 10 substituted or unsubstituted aromatic rings. If desired, when more than one cyclic containing group such as the aromatic groups are employed, the cyclic containing groups can be linked together with the same or different linking group, e.g., a $C_1$-$C_{20}$ alkylene or haloalkylene group optionally containing ether or ester linkages.

Examples of aromatic groups for use herein include, but are not limited to, the following structures:

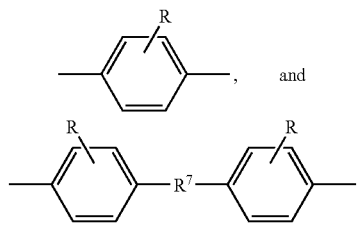

wherein R is independently hydrogen, a $C_1$-$C_{20}$ alkyl group, a hydroxyl group, a $C_1$-$C_{20}$ carboxylic acid group, a $C_1$-$C_{20}$ ester group, a $C_1$-$C_{20}$ alkoxy group, $CO_2^-$, $SO_3^-$, $PO_3^{3-}$, $OPO_3^{2-}$, F, Br, I, $NA_2$ or $NA_3^+$ wherein A is independently hydrogen, a $C_1$-$C_{20}$ alkyl group, a hydroxyl group, a $C_1$-$C_{20}$ carboxylic acid group, a $C_1$-$C_{20}$ ester group, or a $C_1$-$C_{20}$ alkoxy group, or two R groups together with the carbon atom to which they are bonded are joined together to form a cyclic structure optionally containing one or more heterocyclic groups; $R^7$ is a bond, a $C_1$-$C_{20}$ alkylene or haloalkylene group optionally containing ether or ester linkages and wherein the X group and either the L or P or $P^1$ or $P^2$ group may independently be bonded to the aromatic group either ortho, meta and/or para with respect one another. Representative examples of such aromatic groups include, but are not limited to,

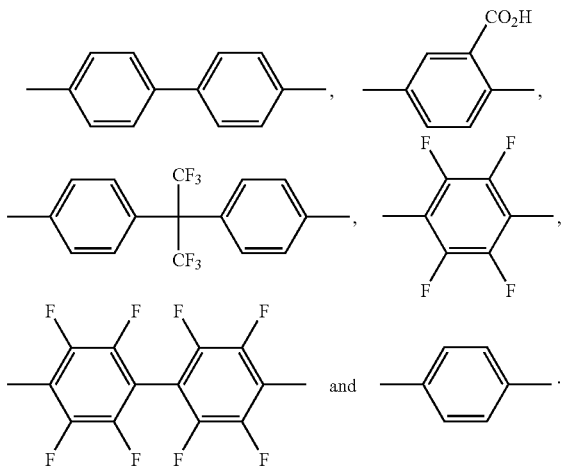

P of prepolymer T-(P)$_n$-T is independently an oxyalkylene radical of the general formula

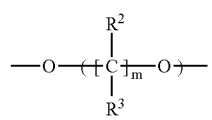

wherein $R^2$ and $R^3$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_3$-$C_{30}$ fluorocycloalkyl group, a $C_5$-$C_{30}$ fluoroaryl group, an ether group, a $C_1$-$C_{20}$ ester group, an amide group, an amine group, fluorine, a vinyl group, and a hydroxyl group and m is 1 to about 10 and preferably from 1 to about 4. Thus, for example, P can be one or more ethylene oxide radicals, one or more propylene oxide radicals, one or more butylene oxide radicals, one or more fluoroethylene oxide radicals, one or more fluoropropylene oxide radicals, one or more fluorobutylene oxide radicals, ethylene oxide-block-propylene oxide block-ethylene oxide radicals and the like and combinations thereof. For the case where more than one oxyalkylene radical is present, the oxyalkylene radicals can be any combination of repeating oxyalkylene units to form random or block copolymers.

The foregoing prepolymers of formula T-(P)$_n$-T can be obtained by reacting one or more trifluorovinyl halide containing compounds of the general formula

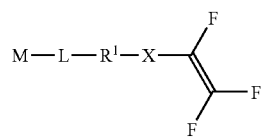

wherein L, $R^1$, and X have the aforestated meanings and M is a halide such as chloride or bromide; with one or more oxyalkylene alcohols of the general formula

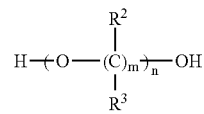

wherein $R^2$, $R^3$, m and n have the aforestated meanings.

In general, the trifluorovinyl halide containing compounds can be reacted with the oxyalkylene alcohols in a molar ratio of trifluorovinyl halide containing compound to oxyalkylene alcohol of from about 1:1 to about 10:1 and preferably from about 2:1 to about 10:1. The temperature for this reaction will ordinarily range from about −50° C. to about 100° C. and preferably from about 0° C. to about 50° C. The time period for this reaction will typically not exceed about 15 hours.

If desired, the reaction can be carried out in one or more suitable solvents. Useful solvents include, but are not limited to, acetates, e.g., methyl acetate, ethyl acetate, propyl acetate, isopropyl acetate, n-butyl acetate, isobutyl acetate, and the like and mixtures thereof; ethers, e.g., ethyl ether, tetrahydrofuran (THF), methyl tert-butyl ether (MTBE) and the like and mixtures thereof; aromatic solvents, e.g., toluene, trifluorotoluene, hexafluoroxylene, xylene, and the like and mixtures thereof; halogenated hydrocarbons, e.g., dichloromethane, ethylene dichloride and the like and mixtures thereof; acetonitrile; N-methyl-2-pyrrolidone (NMP); N,N-dimethylformamide (DMF) and combinations of two or more of these. Generally, the reactants can be present in the solvent in a concentration ranging from about 0.05 M to about 3 M.

$P^1$ of prepolymer $T^1$-$(P^1)_n$-$T^1$ is independently a polysiloxane radical of the general formula

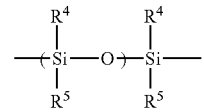

wherein $R^4$ and $R^5$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_3$-$C_{30}$ fluorocycloalkyl group, a $C_5$-$C_{30}$ fluoroaryl group, an ether group, a $C_1$-$C_{20}$ ester group, $C_1$-$C_6$ alkoxy group, an amide group an amine group, fluorine, a vinyl group, and a hydroxyl group. The foregoing prepolymers of formula $T^1$-$(P^1)_n$-$T^1$ can be obtained by methods well known in the art and does not constitute a part of the present invention. See, for example, Smith et al., "Perfluorocyclobutane Aromatic Polyethers. Synthesis and Characterization of New Siloxane-Containing Fluoropolymers", *Macromolecules*, Volume 29, pp. 852-860 (1996). Generally, such prepolymers can be obtained by the reaction of a dihydride terminated poly(dimethylsiloxane) with a suitable vinyl containing compound catalyzed by a conventional hydrosilation catalyst, e.g., a platinum hydrosilation catalyst, and in one or more solvents under conditions well known in the art. Useful solvents include, for example, toluene, dichloromethane, tetrahydrofuran, 1,4 dioxane and the like and mixtures thereof.

$P^2$ of prepolymer $T^2$-$(P^2)_n$-$T^2$ is independently a perfluorocyclobutane radical of the general formula

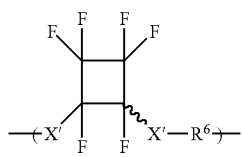

wherein X' is independently a group as defined above for X and is preferably an oxygen atom and $R^6$ independently represents one or more inertly substituted groups as defined above for $R^1$.

The prepolymer $T^2$-$(P^2)_n$-$T^2$ can be obtained by heating a monomer having two dimerizable groups to a temperature and for a time sufficient to form prepolymers having one or more perfluorocyclobutane radicals. Monomers having two dimerizable groups are either commercially available from such sources as, for example, Tetramer Technologies through Oakwood Products (West Columbia, S.C.), or can be prepared by methods known in the art and does not constitute a part of the present invention. Examples of such monomers include 4,4'-bis(4-trifluorovinyloxy)biphenyl, 2,2-bis(4-[trifluorovinyloxy]phenyl)-1,1,1,3,3,3-hexafluoropropane and the like and combinations thereof. By heating the monomer(s), the dimerizable perfluorovinyl groups reacts with another such group to form one or more perfluorocyclobutane radicals represented by the above formula. Conditions for forming prepolymers having one or more perfluorocyclobutane radicals will be discussed hereinbelow. It is to be understood that such prepolymers can be formed prior to copolymerization of the prepolymers herein or can be formed in-situ during the copolymerization process when heating the one or monomers having two dimerizable groups.

The foregoing prepolymers (a)-(c) can be polymerized for a time sufficient to form copolymers. In general, the copolymers obtained herein are substantially linear. In one embodiment, at least two of the prepolymers can be polymerized by heating the prepolymers to a temperature and for a time sufficient to form polymerization products having one or more perfluorocyclobutane radicals in the copolymer backbone. By heating the prepolymers, the dimerizable perfluorovinyl groups (i.e., T, $T^1$ and/or $T^2$) can react with another to form one or more perfluorocyclobutane radicals in the copolymer backbone. It is to be understood that depending on the molecular structure connecting the perfluorocyclobutane radicals, the number of perfluorocyclobutane radicals can vary from as few as one up to thousands. Generally, the resulting polymerization products can have one or more perfluorocyclobutane radicals, and preferably from about 2 to about 100 repeating units. The molecular weight of the resulting polymerization products can vary widely, e.g., a number average molecular weight of at least about 100 and can range from about 100 to about 1,000,000. The process of forming copolymers herein is general and capable of forming biomedical devices having wide ranges of utility. The physical and chemical properties of the resulting products are highly dependent on the choice of the molecular structure between the perfluorocyclobutane aromatic containing radicals as well as the number of perfluorocyclobutane groups. Whereas polyaddition of perfluorovinyl groups to form perfluoroaliphatic polymers (e.g., poly(tetrafluoroethylene)), not generally having perfluorocyclobutane groups, takes place in the presence of free radicals or free radical generating catalysts, dimerization to form perfluorocyclobutane groups takes place thermally.

When a perfluorovinyl group is dimerizable, dimerization is preferably favored over other thermal reactions either kinetically or in equilibrium. As one skilled in the art would readily appreciate, the perfluorovinyl groups on the prepolymer can be separated by at least one atom or group of atoms which does not facilitate isomerization. The atom or group of atoms can include at least one aromatic group or can include a cycloalkyl group. However, aromatic groups are usually preferred due their ease of manufacturing monomers.

Suitable temperatures for forming one or more perfluorocyclobutane radicals can differ according to the structure of the prepolymer(s). In general, temperatures can range from about 50° C. to about 400° C. and preferably from about 75° C. to about 300° C. for formation of perfluorocyclobutane radicals. Temperatures above about 450° C. are usually avoided because perfluorocyclobutane radicals are generally thermally unstable above such temperatures. A suitable time can vary according to the temperature used and the structure of the prepolymer. Generally, the time period for the polymerization can range from about 1 hour to about 100 hours and preferably from about 10 hours to about 40 hours.

Alternatively, in the case when the trifluorovinyl containing prepolymers are capable of radical initiated addition polymerization, conditions conducive to free radical polymerization, e.g. presence of oxygen, ozone, peroxygen compounds and other free radical generating compounds, are avoided so that the trifluorovinyl groups will dimerize into perfluorocyclobutane containing radicals rather than undergoing addition polymerization. Compounds known in the art for stabilization against free radical polymerization are alternatively used. Similarly, when the trifluorovinyl groups are capable of addition polymerization in the presence of anions or cations, compounds which supply such anions or cations are avoided. For example, fluoride ions (e.g. from carbonyl fluorides), chloride, hydroxide, phenoxide and the like are avoided. To avoid such compounds as carbonyl fluorides, oxidative conditions such as the presence of oxygen, hypochlorite, dichromate, permanganate and the like are avoided because the perfluorovinyl groups are known to oxidize to form carbonyl fluorides. Perfluorovinyl ethers, thioethers, sulfones, sulfoxides and the like are relatively stable with regard to addition polymerization and oxidation; and, therefore, such precautions are generally unnecessary when such perfluorovinyl compounds are used.

The prepolymers are suitably neat or, optionally, in admixture with other materials such as in a solution, an emulsion, in supercritical carbon dioxide, a dispersion or in any other form which can provide a polymerization product.

Suitable solvents are those which are inert to the conditions encountered in the polymerization reaction and include, but are not limited to, xylene, mesitylene and perfluorotetradecahydrophenanthrene. At atmospheric pressure, preferred solvents are those which attain temperatures of about 170° C. to about 250° C. such as, for example, dichlorobenzene, trichlorobenzene, diphenyl oxide and perfluorotetradecahydrophenanthrene. When a solvent is used, the concentration of monomers in solvent is advantageously from about 0.1 to about 99.9 weight percent and preferably from about 10 to about 90 weight percent by weight monomer.

Polymerization or dimerization suitably takes place at any pressure. Pressures are generally chosen such that the monomeric mixtures and any solvents and/or dispersing media remain liquid at the temperatures used for polymerization. When the prepolymers or other materials evaporate at temperatures used, then it is generally preferable to maintain a pressure at least sufficient to maintain the materials liquid.

Alternatively, at least two of the foregoing prepolymers (a)-(c) may be polymerized by free radical polymerization by exposing the mixtures to heat and/or radiation, e.g., ultraviolet light (UV), visible light, or high energy radiation, to produce biomedical devices such as contact lenses according to conventional methods. A polymerization initiator may be included in the mixture to facilitate the polymerization step. Representative free radical thermal polymerization initiators are organic peroxides such as, for example, acetal peroxide, lauroyl peroxide, decanoyl peroxide, stearoyl peroxide, benzoyl peroxide, tertiarylbutyl peroxypivalate, peroxydicarbonate, and the like and mixtures thereof. Representative UV initiators are those known in the field such as, for example, benzoin methyl ether, benzoin ethyl ether, Darocure 1173, 1164, 2273, 1116, 2959, 3331 (EM Industries) and Igracure 651 and 184 (Ciba-Geigy), and the like and mixtures thereof. Generally, the initiator will be employed in the monomeric mixture at a concentration at about 0.1 to about 5 percent by weight of the total mixture.

The forgoing prepolymers and polymerization products are particularly useful as biomedical devices intended for direct contact with body tissue or fluid. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses. A wide variety of types of contact lens materials can be produced herein ranging from hard, gas permeable lens materials; soft hydrogel lens materials to soft, non-hydrogel lens materials. A particularly preferred contact lens is a rigid gas permeable lens.

The biomedical devices, e.g., contact lenses or intraocular lenses, can be prepared by polymerizing the foregoing prepolymers to form a product that can be subsequently formed into the appropriate shape by, for example, lathing, injection molding, compression molding, cutting and the like. Alternatively, the reaction mixture may be placed in a mold and subsequently cured into the appropriate product.

For example, in producing contact lenses, the initial prepolymers may be polymerized in tubes to provide rod-shaped articles, which are then cut into buttons. The buttons may then be lathed into contact lenses. Alternately, the contact lenses may be cast directly in molds from the prepolymers, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the prepolymers to a mold, and spinning the mold in a controlled manner while exposing the prepolymers to a radiation source such as UV light. Static casting methods involve charging the prepolymers between two mold sections, one mold section shaped to form the anterior lens surface and the other mold section shaped to form the posterior lens surface, and curing the prepolymers while retained in the mold assembly to form a lens, for example, by free radical polymerization of the prepolymers. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a prepolymers is cured by spincasting in a mold to form a shaped article having an anterior lens surface and a relatively large thickness, and the posterior surface of the cured spincast article is subsequently lathed to provide a contact lens having the desired thickness and posterior lens surface.

When polymerizing the prepolymers by the thermal technique discussed above, a resin or metal material that is capable of withstanding high temperatures, i.e., thermally stable, should be employed as a contact lens mold. For example, in injection molding, the resin should have a heat deflection temperature of at least 350° C. and a hardness of at least 100 on the Rockwell Hardness Scale (M scale). Suitable resins include, but are not limited to, engineering plastics based on polyetherimide resins (e.g., ULTEM™ available from General Electric Co., Polymers Product Dept.); polyamide-imide plastics (e.g., TORLON available from Amoco Performance Products); polyphenylene sulfide plastics (e.g., RYTON™ available from Phillips Petroleum Co.); polysulfone and polyarylsulfone plastics (e.g., UDEL™ and RADEL™ available from Amoco Performance Products); polythalamide plastics (e.g., AMODEL available from Amoco Performance Products); polyketone plastics (e.g., KADEL™ available from Amoco Performance Products); various liquid crystal polymer resins (e.g., XYDAR™ available from Amoco Performance Products) and the like.

Optionally, the prepolymers herein may include additional components according to the specific type of lens being produced. For example, when producing rigid gas-permeable (RGP) materials, the prepolymer reaction mixture may further include one or more crosslinking agents, a small amount of a wetting monomer; and optionally other agents such as strengthening agents or UV absorbing or dye monomers. The crosslinking and wetting agents can include those crosslinking and wetting agents known in the prior art for making RGP materials. The content of the crosslinking agent is chosen to provide a dimensionally stable lens material resistant to breakage and stress crazing. The amount of wetting monomer used is adjusted within limits to provide sufficient wetting characteristics so as to maintain a stable tear film while at the same time keeping a sufficiently low water content, e.g., a polymer system containing less than about 5 wt. % water.

When producing a hydrogel lens, the prepolymer reaction mixture may further include at least a diluent that is ultimately replaced with water when the polymerization product is hydrated to form a hydrogel. Generally, the water content of the hydrogel is greater than about 5 wt. % and more commonly between about 10 to about 80 wt. %. The amount of diluent used should be less than about 50 wt. % and in most cases, the diluent content will be less than about 30 wt. %. However, in a particular polymer system, the actual limit will be dictated by the solubility of the various monomers in the diluent. In order to produce an optically clear copolymer, it is important that a phase separation leading to visual opacity does not occur between the prepolymers and the diluent, or the diluent and the final copolymer.

Furthermore, the maximum amount of diluent which may be used will depend on the amount of swelling the diluent causes the final copolymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; and the like and mixtures thereof. If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific prepolymer components, as can be readily determined by one skilled in the art. If desired the prepolymers used to produce the hydrogel lens may be polymerized in the presence of crosslinking and wetting agents known in the prior art for making hydrogel materials.

The contact lenses obtained herein may be subjected to optional machining operations. For example, the optional machining steps may includes buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative of the invention. The examples should not be read as limiting the scope of the invention as defined in the claims.

EXAMPLE 1

This example illustrates the preparation of a 3-(4-[trifluorovinyloxy]phenyl)propyl terminated poly(dimethylsiloxane) having a number average molecular weight ($M_n$) of 1128, a weight average molecular weight of 1523 and a polydispersity (PD) of 1.35 (as determined using SEC and by comparison to standards of known molecular weight) and of the formula

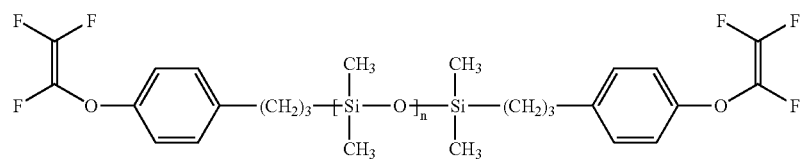

wherein n is an average of 8.

To a solution of hydride terminated poly(dimethylsiloxane) obtained from Aldrich Chemical Co. (Milwaukee, Wis.) (average $M_n$ 580 g/mol, 3.47 g) and 4-(trifluorovinyloxy)allylbenzene (3.87 g, 17.9 mmol) prepared from 1-bromo-4-(trifluorovinyloxy)benzene obtained from Oakwood Products, Inc. (West Columbia, S.C.) using procedures set forth in the literature (e.g., *Polymer Preprints,* 39(1), p. 530 (1998)) in tetrahydrofuran/1,4-dioxane (2:1 v/v, 36 mL) was added 10% solution of platinum-1,3-divinyl-1,1,3,3-tetramethyldisiloxane complex in xylenes (0.01 mL) and the solution was heated 15 hours at 60° C. The solvents were removed from the cooled solution at reduced pressure and the crude product was purified via column chromatography (0-50% dichloromethane/pentane, silica gel, 5×5 cm) to provide a product as a colorless oil (3.95 g, 66%): $^1$H NMR (CDCl$^3$, 400 MHz) δ 7.15 (d, J=8

Hz, 4H), 7.00 (d, J=8 Hz, 4H), 2.60 (t, J=8 Hz, 4H), 1.66-1.60 (m, 4H), 0.57 (t, J=8 Hz, 4H), 0.07 (s, approximately 63H).

EXAMPLE 2

Copolymerization of T End-capped poly(alkyl ether), poly(siloxane), and poly(PFCB) prepolymers A monomeric mixture was prepared by dissolving 0.42 g of 4-(trifluorovinyloxy)benzoate terminated poly(ethylene glycol) (1) having a $M_n$ of 1006, a weight average molecular weight ($M_w$) of 1234 and a PD of 1.23, 3-(4-[trifluorovinyloxy]phenyl)propyl terminated poly(dimethylsiloxane) (2) of Example 1, and 0.43 g (1.11 mmol) of 2,2-bis(4-trifluorovinyloxyphenyl)-1,1,1,3,3,3-hexafluoropropane (3), with stirring and gentle heating. The warm solution (insoluble at ambient temperature) was clamped between silanized glass plates with a Teflon tape spacer and heated at 195° C. for 40 hours under nitrogen purge to afford a viscous, transparent oil (1.28 g, 100%); SEC (THF, PS standards). The reaction scheme of this example is generally set forth in FIG. 1 wherein m and n and x, y, and z are such that the copolymer has a $M_n$=3641, $M_w$=14664, and PD=4.03. The weight average molecular weight ($M_w$) was Measured at various points during curing. These results are set forth below in Table 1.

TABLE 1

| Cure time | Weight average molecular weight (g/mol) | | | |
|---|---|---|---|---|
| (h) | 1 | 2 | 3 | Copolymer |
| 0 | 1234 | 2054 | N/A | N/A |
| 20 | 4993 | 8478 | 4133 | 6836 |
| 40 | 7668 | 15914 | 7498 | 14664 |

EXAMPLE 3

Synthesis of End-capped poly(ethylene oxide) prepolymer (prepolymer 1)

A solution of 4-(trifluorovinyloxy)benzoyl chloride (1.85 g, 7.8 mmol) prepared from 1-bromo-4-(trifluorovinyloxy)benzene obtained from Oakwood Products, Inc. (West Columbia, S.C.) using procedures set forth in the literature (e.g., Polymer Preprints, 43(1), p. 487 (2002)) in tetrahydrofuran (5 mL) was treated with a solution of Poly(ethylene oxide) having a $M_n$ of 300 (0.78 g, 2.6 mmol) and triethylamine (1.21 mL, 8.7 mmol) in tetrahydrofuran (5 mL) dropwise under inert atmosphere. After 15 hours at ambient temperature, the reaction mixture was diluted in dichloromethane (30 mL), washed with $NaHCO_3$(aq) (0.25 M, 1×25 mL), dried over $Na_2SO_4$, filtered, and solvents were removed under reduced pressure. The crude oil was purified by column chromatography (3×3 cm, silica gel, 0-50% dichloromethane/pentane) and solvents removed under reduced pressure to afford the product as a viscous oil (0.42 g, 23%): $^1$H NMR ($CDCl_3$, 400 MHz): δ 8.06 (d, 4H), J=8 Hz), 7.11 (d, 4H), J=8 Hz), 4.48 (br, 4H), 3.79 (br, 4H), 3.61 (br, 22.3H); SEC (THF, PS standards): $M_n$=1006 g/mol, $M_w$=1234 g/mol, and a PD 1.23. This reaction is generally shown below in Scheme 1.

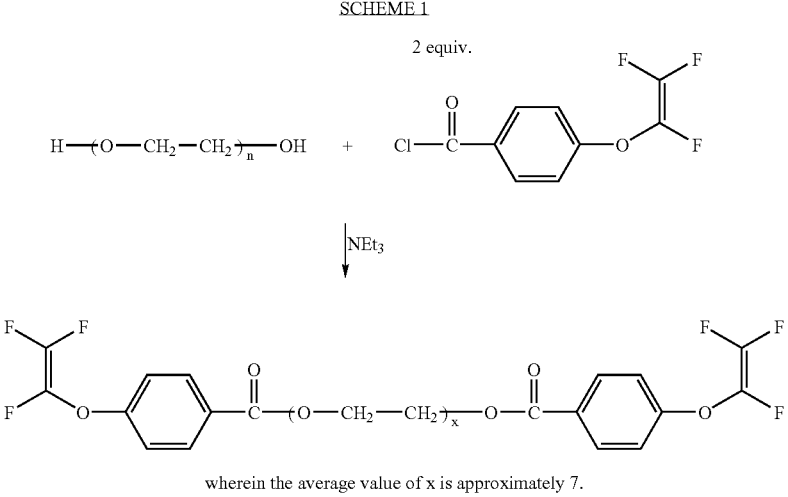

SCHEME 1 wherein the average value of x is approximately 7.

EXAMPLE 4

Synthesis of End-capped poly(ethylene oxide-block-propylene oxide-block-thylene oxide) prepolymer (prepolymer 2)

Polyoxamer 108 supplied as Pluronic F38 (4700 g/mol, 3.45 g), obtained from BASF Co. (Florham Park, N.J.) was reacted using substantially the same procedure described in Example 3 to afford the product as a solid (2.01 g, 54%): GPC (THF, PS standards): $M_n$=9637 g/mol, $M_w$=8761 g/mol, PD=1.10; $^1$H NMR ($CDCl_3$, 400 MHz); δ 8.08 (d, J=8 Hz, 4H), 7.13 (d, J=8 Hz, 4H), 4.54 (t, J=5 Hz, 4H), 3.82-3.37m, 530H), 1.15-1.11 (m, 60H). The final product is represented by the following formula:

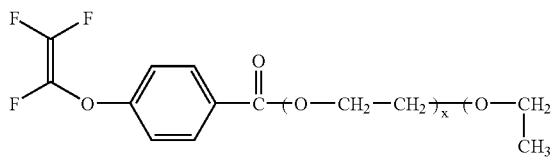

wherein x is y and z are such that the product has a $M_n$=9637 g/mol, $M_w$=8761 g/mol, and PD=1.1.

EXAMPLE 5

Synthesis of End-capped poly(perfluoroalkyl ether) prepolymer (prepolymer 3)

Fomblin Z DOL 2000 (a hydroxy terminated poly(perfluoroethylene containing glycol)) (2000 g/mol) obtained from Solvay Solexis (Thorofare, N.J.) was reacted using substantially the same procedure described in Example 3 except using dichloromethane instead of tetrahydrofuran as solvent to afford the product as a viscous oil (0.58 g, 17%): GPC (THF, PS standards): $M_n$=1604 g/mol, $M_w$=1656 g/mol, PD=1.05 g/mol; $^1$H NMR (CDCl$_3$, 400 MHz); δ 8.08 (d, J=8 Hz, 4H), 7.15 (d, J=8 Hz, 4H), 4.67(m, 4.70-4.64, 4H). The final product is represented by the following formula:

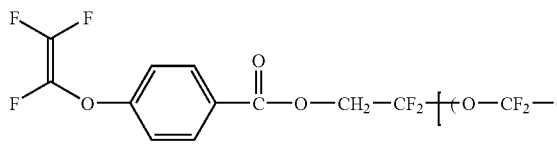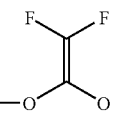

wherein m and n are such that the product has a $M_n$=1604, $M_w$=1656 g/mol, and PD=1.05.

EXAMPLE 6

Samples of the materials from Examples 3-5 were clamped between silanized glass plates with Teflon spacers and heated under nitrogen atmosphere at 195° C. for various times. In each case the isolated products were oils of varied viscosities. The linear polymers were dissolved in tetrahydrofuran (5 mg/mL) and analyzed via GPC (relative to PS standards) to demonstrate increase in molecular weight as a function of thermal cure time. The molecular weight analysis of the polymerized products are set forth below in Table 2.

TABLE 2

Molecular Weight Analysis of Thermal Trifluorovinylarylether end-capped Poly(alkylether) Polymerization at 195° C. as Determined by SEC

| Cure time(h) | Prepolymer 1 $M_n$ (g/mol) | PD | Prepolymer 2 $M_n$ (g/mol) | PD | Prepolymer 3 $M_n$ (g/mol) | PD |
|---|---|---|---|---|---|---|
| 0 | 1006 | 1.23 | 9637 | 1.10 | 1583 | 1.05 |
| 20 | 2123 | 2.35 | 13205 | 1.43 | 2815 | 1.45 |
| 40 | 2945 | 2.60 | 19529 | 1.82 | 4707 | 1.71 |

EXAMPLE 7

Thermal Cast Molding of poly(perfluorocyclobutane) Films

The material of Example 2 and 1,1,1-tris(4-[trifluorovinyloxy]phenyl)ethane obtained from Oakwood Products, Inc. is melted with gentle heating and clamped between glass plates with Teflon® tape spacers of varied thicknesses. The assemblies can be sealed in a heating oven with a constant N$_2$ purge and heated for 20 hours at 195° C. The cooled films can then be removed from the plates and believed to yield a transparent, colorless, glassy film. The films can be further cut into wafers for oxygen permeability and refractive index determination:

EXAMPLE 8

Thermal Cast Molding of poly(perfluorocyclobutane) Button

The material of Example 2 and 1,1,1-tris(4-[trifluorovinyloxy]phenyl)ethane obtained from Oakwood Products, Inc. is added to a flat-bottomed, 15 mm diameter glass test tube. The vessel is sealed in a heating oven with a constant N$_2$ purge and heated for 68 hours at 155° C. The cooled vessel is removed from the oven and test tube and believed to yield a transparent, colorless, glassy button for lathing into a Rigid, Gas-Permeable (RGP) contact lens.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A perfluorocyclobutane ring-containing copolymer which is obtained by copolymerization of at least two of the following prepolymers (a) T -(P)$_n$-T, (b) T$^1$-(P$^1$)$_n$-T$^1$ and (c) T$^2$-(P$^2$)$_n$-T$^2$ wherein n is independently 1 to about 100,000 and T, T$^1$ and T$^2$ are independently of the general formula

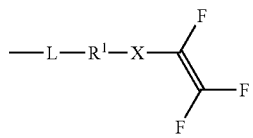

wherein L is an optional linking group and is independently a straight or branched $C_1$-$C_{30}$ alkyl group, a $C_3$-$C_{30}$ cycloalkyl group, a $C_5$-$C_{30}$ aryl group, an ether group, a $C_1$-$C_{20}$ ester group, an amide group, a siloxanyl, an arylsiloxanyl or a fluorosiloxanyl, $R^1$ independently represents one or more inertly substituted groups; and each X is independently a group which links the inertly substituted groups and the trifluorovinyl group and is selected from the group consisting of a bond, an oxygen atom, a sulfur atom, a carboxylic ester group, a thiocarboxylic ester group, an amide group, a sulfone, a sulfoxide, a carbonate, a carbamate, a perfluoroalkylene, a perfluoroalkylene ether, an alkylene, an acetylene, a phosphine, a carbonyl group, a thiocarbonyl group, seleno, telluro, nitrido, a silanediyl group, a trisilanediyl group, a tetrasilanetetrayl group, a siloxanediyl group, a disiloxanediyl group, a trisiloxyldiyl group, a trisilazanyl group, a silythio group, a boranediyl group and combinations thereof; P is independently an oxyalkylene radical of the general formula

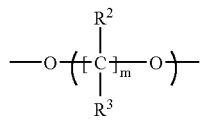

wherein $R^2$ and $R^3$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_3$-$C_{30}$ fluorocycloalkyl group, a $C_5$-$C_{30}$ fluoroaryl group, an ether group, a $C_1$-$C_{20}$ ester group, an amide group, an amine group, fluorine, a vinyl group, or a hydroxyl group and m is 1 to about 10; $P^1$ is a polysiloxane radical of the general formula

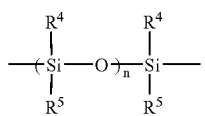

wherein $R^4$ and $R^5$ are independently hydrogen, a straight or branched $C_1$-$C_6$ alkyl group, a $C_3$-$C_{30}$ cycloalkyl group, a $C_5$-$C_{30}$ aryl group, a straight or branched $C_1$-$C_6$ fluoroalkyl group, a $C_3$-$C_{30}$ fluorocycloalkyl group, a $C_5$-$C_{30}$ fluoroaryl group, an ether group, a $C_1$-$C_{20}$ ester group, $C_1$-$C_6$ alkoxy group, an amide group an amine group, fluorine, a vinyl group, or a hydroxyl group; and $P^2$ is a perfluorocyclobutane radical of the general formula

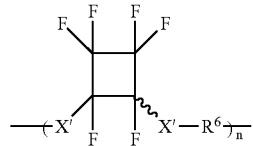

wherein $R^6$ independently represents one or more inertly substituted groups and X' is independently a bond, an oxygen atom, a sulfur atom, a carboxylic or thiocarboxylic ester group, a sulfone, a sulfoxide, perfluoroalkylene, perfluoroalkylene ether, alkylene, acetylene, a phosphine, a carbonyl or thiocarbonyl group; seleno; telluro; nitrido; a silanediyl group, a trisilanedjyl group, a tetrasilanetetrayl group, a siloxanediyl group, a disiloxanediyl group, a trisiloxyl group, a trisilazanyl group, a silythio group, or a boranediyl group.

2. The perfluorocyclobutane ring-containing copolymer of claim 1, wherein $R^1$ and $R^6$ are independently selected from the group consisting of

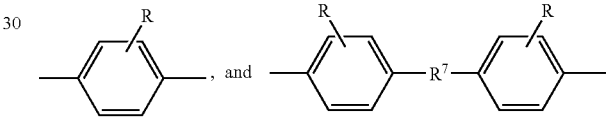

wherein R is independently hydrogen, a $C_1$-$C_{20}$ alkyl group, a hydroxyl group, a $C_1$-$C_{20}$ carboxylic acid group, a $C_1$-$C_{20}$ ester group, a $C_1$-$C_{20}$ alkoxy group, $CO_2^-$, $SO_3^-$, $PO_3^-$ $OPO_3^{2-}$, F, Br, I, $NA_2$ or $NA_3^{30}$ wherein A is independently hydrogen, a $C_1$-$C_{20}$ alkyl group, a hydroxyl group, a $C_1$-$C_{20}$ carboxylic acid group, a $C_1$-$C_{20}$ ester group, or a $C_1$-$C_{20}$ alkoxy group, or two R groups together with the carbon atom to which they are bonded are joined together to form a cyclic structure optionally containing one or more heterocyclic groups; $R^7$ is a bond, a $C_1$-$C_{20}$ alkylene or haloalkylene group optionally containing ether or ester linkages and wherein the X group and either the L or P or $P^1$ or $P^2$ group may independently be bonded to the aromatic group either ortho, meta and/or para with respect one another.

3. The perfluorocyclobutane ring-containing copolymer of claim 1, wherein the prepolymer T-$(P)_n$-T has a number average molecular weight of from about 100 about 100,000.

4. The perfluorocyclobutane ring-containing copolymer of claim 1, wherein the prepolymer $T^1$-$(P^1)_n$-$T^1$ has a number average molecular weight of from about 100 about 100,000.

5. The perfluorocyclobutane ring-containing copolymer of claim 1, wherein the prepolymer $T^2$-$(P^2)_n$-$T^2$ has a number average molecular weight of from about 100 about 100,000.

6. The perfluorocyclobutane ring-containing copolymer of claim 1, which is obtained by copolymerizing one or more of the prepolymer T-$(P)_n$ T with one or more of the prepolymer $T^1$-$(P^1)_n$-$T^1$.

7. The perfluorocyclobutane ring-containing copolymer of claim 1, which is obtained by copolymerizing one or more of the prepolymer $T^1$-$(P^1)_n$-$T^1$ with one or more of the prepolymer $T_2$-$(P^2)_n$-$T^2$.

8. The perfluorocyclobutane ring-containing copolymer of claim 1, which is obtained by copolymerizing one or more of the prepolymer $T^1\text{-}(P^1)_n\text{-}T^1$ with one or more of the prepolymer $T^2\text{-}(P^2)_n\text{-}T^2$.

9. The perfluorocyclobutane ring-containing copolymer of claim 1, which is obtained by copolymerizing one or more of the prepolymer $T\text{-}(P)_n\text{-}T$ with one or more of the prepolymer $T^1\text{-}(P^1)_n\text{-}T^1$ and with one or more of the prepolymer $T^2\text{-}(P^2)_n\text{-}T^2$.

10. A process for preparing a copolymer comprising polymerizing at least two of the following prepolymers (a) $T\text{-}(P)_n\text{-}T$, (b) $T^1\text{-}(P^1)_n\text{-}T^1$ and (c) $T^2\text{-}(P^2)_n\text{-}T^2$ for a sufficient time to form the perfluoro containing copolymer, wherein n is independently 1 to about 100,000 and T, $T^1$ and $T^2$ are independently of the general formula

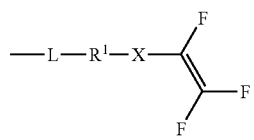

wherein L is an optional linking group and is independently a straight or branched $C_1\text{-}C_{30}$ alkyl group, a $C_3\text{-}C_{30}$ cycloalkyl group, a $C_5\text{-}C_{30}$ aryl group, an ether group, a $C_1\text{-}C_{20}$ ester group, an amide group, a siloxanyl, an arylsiloxanyl or a fluorosiloxanyl, $R^1$ independently represents one or more inertly substituted groups; and each X is independently a group which links the inertly substituted groups and the trifluorovinyl group and is selected from the group consisting of a bond, an oxygen atom, a sulfur atom, a carboxylic ester group, a thiocarboxylic ester group, an amide group, a sulfone, a sulfoxide, a carbonate, a carbamate, a perfluoroalkylene, a perfluoroalkylene ether, an alkylene, an acetylene, a phosphine, a carbonyl group, a thiocarbonyl group, seleno, telluro, nitrido, a silanediyl group, a trisilanedivl group, a tetrasilanetetrayl group, a siloxanediyl group, a disiloxanedjyl group, a trisiloxyldiyl group, a trisilazanyl group, a silythio group, a boranediyl group and combinations thereof; P is independently an oxyalkylene radical of the general formula

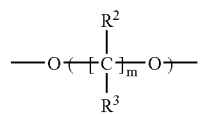

wherein $R^2$ and $R^3$ are independently hydrogen, a straight or branched $C_1\text{-}C_6$ alkyl group, a $C_3\text{-}C_{30}$ cycloalkyl group, a $C_5\text{-}C_{30}$ aryl group, a straight or branched $C_1\text{-}C_6$ fluoroalkyl group, a $C_3\text{-}C_{30}$ fluorocycloalkyl group, a $C_5\text{-}C_{30}$ fluoroaryl group, an ether group, a $C_1\text{-}C_{20}$ ester group, an amide group, an amine group, fluorine, a vinyl group, or a hydroxyl group and m is 1 to about 10; $P^1$ is a polysiloxane radical of the general formula

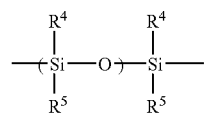

wherein $R^4$ and $R^5$ are independently hydrogen, a straight or branched $C_1\text{-}C_6$ alkyl group, a $C_3\text{-}C_{30}$ cycloalkyl group, a $C_5\text{-}C_{30}$ aryl group, a straight or branched $C_1\text{-}C_6$ fluoroalkyl group, a $C_3\text{-}C_{30}$ fluorocycloalkyl group, a $C_5\text{-}C_{30}$ fluoroaryl group, an ether group, a $C_1\text{-}C_{20}$ ester group, $C_1\text{-}C_6$ alkoxy group, an amide group an amine group, fluorine, a vinyl group, or a hydroxyl group; and $P^2$ is a perfluorocyclobutane radical of the general formula

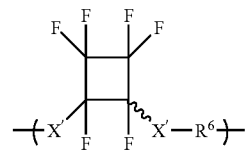

wherein X' is independently a bond, an oxygen atom, a sulfur atom, a carboxylic or thiocarboxylic ester group, a sulfone, a sulfoxide, perfluoroalkylene, perfluoroalkylene ether, alkylene, acetylene, a phosphine, a carbonyl or thiocarbonyl group; seleno; telluro; nitrido; a silanedjyl group, a trisilanediyl group, a tetrasilanetetrayl group, a siloxanediyl group, a disiloxanediyl group, a trisiloxyl group, a trisilazanyl group, a silythio group, or a boranediyl group and $R^6$ independently represents one or more inertly substituted groups and wherein the perfluorocyclobutane prepolymer (c) $T^2\text{-}P^2\text{-}T^2$ can be generated in situ from one or more monomers having two dimerizable perfluorovinyl groups.

11. A biomedical device comprising the perfluorocyclobutane ring-containing copolymer of claim 1.

12. The biomedical device of claim 11, which is an ophthalmic lens.

13. The biomedical device of claim 12, wherein the ophthalmic lens is a contact lens.

14. The biomedical device of claim 13, wherein the contact lens is a rigid gas permeable lens.

* * * * *